(12) United States Patent
Li et al.

(10) Patent No.: US 8,607,284 B2
(45) Date of Patent: Dec. 10, 2013

(54) METHOD OF OUTPUTTING VIDEO CONTENT FROM A DIGITAL MEDIA SERVER TO A DIGITAL MEDIA RENDERER AND RELATED MEDIA SHARING SYSTEM

(75) Inventors: FeiJun Li, Hangzhou (CN); XueHui Wang, Hangzhou (CN)

(73) Assignee: ArcSoft (Hangzhou) Multimedia Technology Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 13/296,253

(22) Filed: Nov. 15, 2011

(65) Prior Publication Data

US 2013/0125192 A1    May 16, 2013

(51) Int. Cl.
*H04N 7/18* (2006.01)
*H04N 7/173* (2011.01)
*H04N 7/16* (2011.01)

(52) U.S. Cl.
USPC .................. 725/93; 725/82; 725/88; 725/141

(58) Field of Classification Search
USPC ........................................ 725/82, 88, 93, 141
See application file for complete search history.

(56) References Cited

U.S. PATENT DOCUMENTS

| | | | | |
|---|---|---|---|---|
| 6,963,910 | B1 * | 11/2005 | Belknap et al. | 709/223 |
| 2007/0005783 | A1 * | 1/2007 | Saint-Hillaire et al. | 709/230 |
| 2007/0157267 | A1 * | 7/2007 | Lopez-Estrada | 725/90 |
| 2007/0230905 | A1 * | 10/2007 | Kato et al. | 386/94 |
| 2011/0091183 | A1 * | 4/2011 | Nakamura | 386/230 |
| 2011/0276712 | A1 * | 11/2011 | Narula et al. | 709/231 |
| 2012/0019367 | A1 * | 1/2012 | Roth et al. | 340/10.6 |

FOREIGN PATENT DOCUMENTS

| | | | |
|---|---|---|---|
| JP | 2005143021 | A | 6/2005 |
| JP | 200861150 | A | 3/2008 |
| JP | 201061306 | A | 3/2010 |
| JP | 2010278504 | A | 12/2010 |
| JP | 201190461 | A | 5/2011 |

* cited by examiner

*Primary Examiner* — Jason J Chung
*Assistant Examiner* — Sumaiya A Chowdhury
(74) *Attorney, Agent, or Firm* — Winston Hsu; Scott Margo

(57) ABSTRACT

A method of outputting video content from a digital media server to a digital media renderer includes providing a digital media controller to select a digital media renderer for video playback, sending a playback request from the digital media controller to the selected digital media renderer, the selected digital media renderer requesting data from the digital media server in response to receiving the playback request from the digital media controller, and the digital media server capturing video and capturing audio. The method further includes the digital media server encoding the captured video and the captured audio to respectively produce encoded video and encoded audio, outputting the encoded video and the encoded audio from the digital media server to the selected digital media renderer, and playing the encoded video and the encoded audio on the selected digital media renderer.

20 Claims, 2 Drawing Sheets

METHOD OF OUTPUTTING VIDEO CONTENT FROM A DIGITAL MEDIA SERVER TO A DIGITAL MEDIA RENDERER AND RELATED MEDIA SHARING SYSTEM

BACKGROUND OF THE INVENTION

1. Field of the Invention

The invention relates to a media sharing system, and more particularly, to a method of capturing screen content from a digital media server and outputting video content to a digital media renderer for playback on the digital media renderer.

2. Description of the Prior Art

With consumer electronics becoming increasingly popular, there has been a trend to link electronic devices together in order to permit communication or sharing between various devices. However linking two or more devices together is not always a simple task.

For example, in order to connect a computer to a television (TV), either a direct cable connection or a wireless display (WiDi) connection is needed. Direct cable connections are also inconvenient and require cable to be run from one device to another which can be expensive and unsightly. Furthermore, in order to support WiDi requirements for communication between the computer and the TV, special hardware requirements are involved for both the computer and the TV. This may require either new hardware to be bought or upgrades to existing devices.

SUMMARY OF THE INVENTION

It is therefore one of the primary objectives of the claimed invention to provide a method of capturing screen content from a digital media server and outputting video content to a digital media renderer for playback on the digital media renderer.

According to an exemplary embodiment of the claimed invention, a method of outputting video content from a digital media server (DMS) to a digital media renderer (DMR) is disclosed. The method includes providing a digital media controller (DMC) to select a DMR for video playback, sending a playback request from the DMC to the selected DMR, the selected DMR requesting data from the DMS in response to receiving the playback request from the DMC, and the DMS capturing video and capturing audio. The method further includes the DMS encoding the captured video and the captured audio to respectively produce encoded video and encoded audio, outputting the encoded video and the encoded audio from the DMS to the selected DMR, and playing the encoded video and the encoded audio on the selected DMR.

According to another exemplary embodiment of the claimed invention, a media sharing system for sharing video content includes a digital media controller (DMC) selecting a digital media renderer (DMR) for video playback and sending a playback request from the DMC to the selected DMR, and a digital media server (DMS) capturing video and capturing audio in response to receiving a data request from the selected DMR, the DMS encoding the captured video and the captured audio to respectively produce encoded video and encoded audio, and the DMS outputting the encoded video and the encoded audio to the selected DMR. The media sharing system also includes the selected DMR playing the encoded video and the encoded audio in response to receiving the encoded video and the encoded audio from the DMS.

It is an advantage that the present invention provides a way for the DMS to communicate with the DMR and output video content to the DMR without the need to replace or upgrade hardware. Video and audio content is captured by the DMS before it is encoded for transmission to the DMR. In this way, video and audio content can conveniently be shared on the DMR by using a DMC to control playback from anywhere a user wishes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
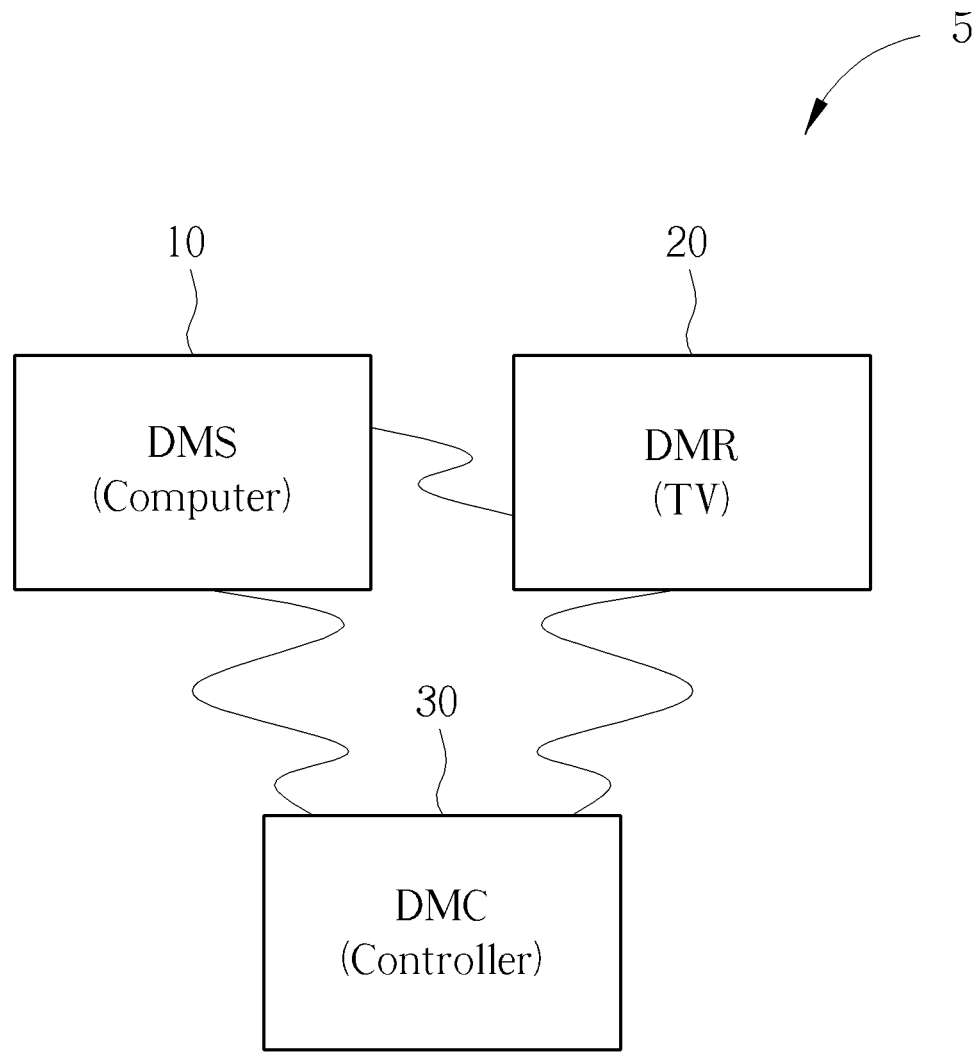
FIG. 1 is a block diagram of a media sharing system according to the present invention.

Please refer to FIG. 1. FIG. 1 is a block diagram of a media sharing system 5 according to the present invention. The media sharing system 5 includes a digital media server (DMS) 10 which can be implemented using a computer, a digital media renderer (DMR) 20 that can be implemented using a television (TV), and a digital media controller (DMC) 30 that can be implemented using a wide variety of controlling devices such as a personal digital assistant (PDA), a smart phone, a tablet computer, and so on. Each of the DMS 10, the DMR 20, and the DMC 30 preferably communicates with one another through the Digital Living Network Alliance (DLNA) protocol.

The present invention uses a new approach for enabling communication between the DMS 10, such as a computer, and the DMR 20, such as the TV, without the need to purchase new equipment or upgrade the hardware of any device, while at the same time being easy to use. Because support for the DLNA protocol is now very common among consumer electronic devices, an ordinary TV can serve as the DMR 20. Thus, the DLNA protocol can be used to provide communication between a computer serving as the DMS 10 and the DMR 20 through an ordinary wireless local area network (WLAN) connection, such as "WiFi" connections adhering to the IEEE 802.11 protocol.

In the present invention, a computer serving as the DMS 10 is used to capture video and audio in real time, to encode the video and audio into a video stream, and to output the video and audio on the DMR 20 using the DMC 30 to control playback. In order to capture the video content, a computer serving as the DMS 10 can perform a screen capture to capture the contents of the computer screen. The video and audio data can be played directly on the DMR 20 after being output from the DMS 10, and there is no need for additional equipment to be used. Furthermore, playback can be controlled anywhere within a wired or wireless local area network (LAN) through which the DMS 10, the DMR 20, and the DMC 30 communicate.

Figure 2:
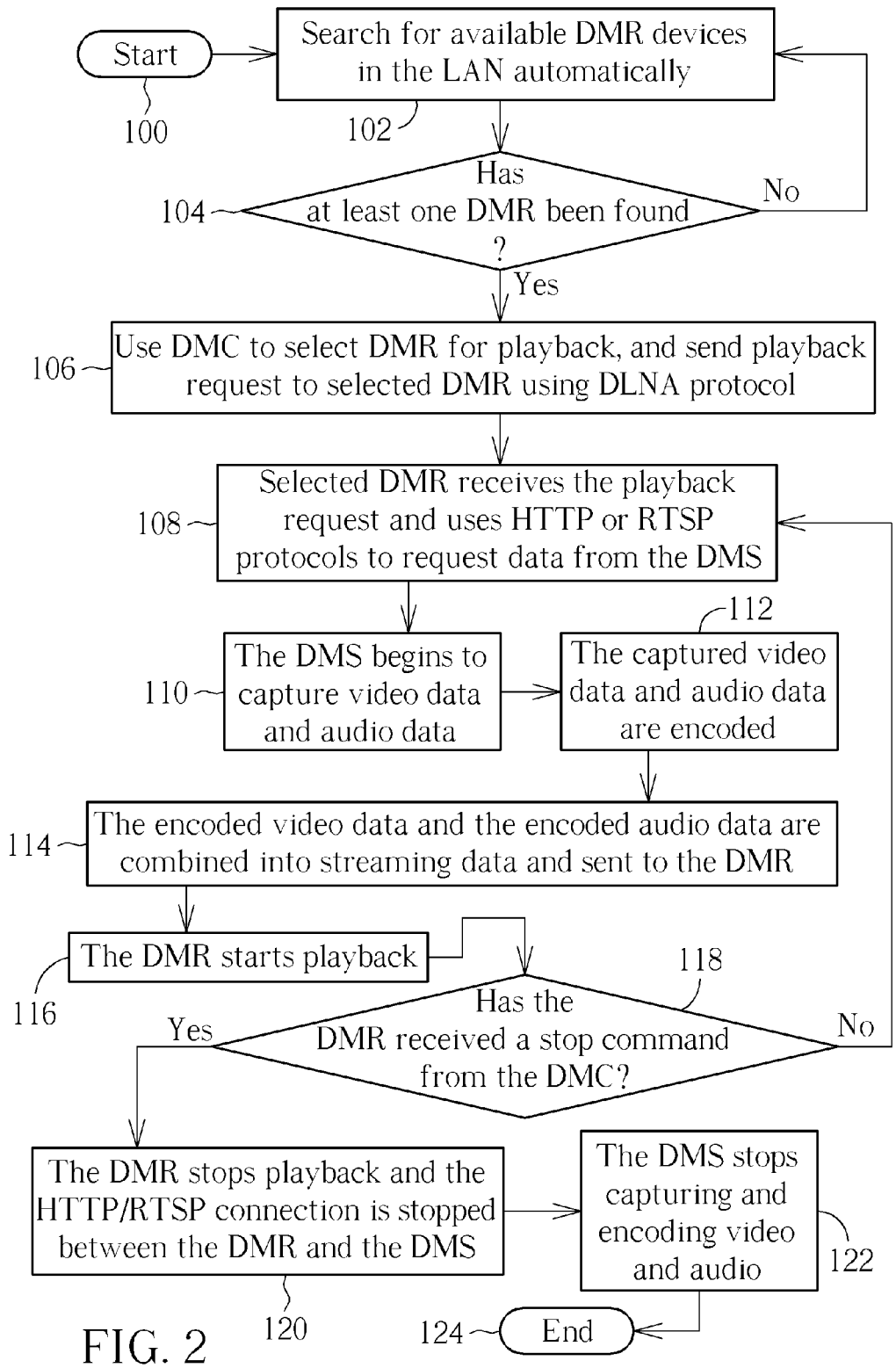
FIG. 2 is a flowchart describing the method of outputting video content from a DMS to a DMR according to the present invention.

Please refer to FIG. 2. FIG. 2 is a flowchart describing the method of outputting video content from the DMS 10 to the DMR 20 according to the present invention. Steps in the flowchart will be explained as follows.

Step 100: Start.

Step 102: Search for available DMR 20 devices in the LAN automatically.

Step 104: Determine if at least one DMR 20 has been found. If so, go to step 106. If not, go back to step 102.

Step 106: Use the DMC 30 to select the DMR 20 for playback, and use the DLNA protocol to send a playback request to the selected DMR 20.

Step 108: The selected DMR 20 receives the playback request and uses Hypertext Transfer Protocol (HTTP) or Real Time Streaming Protocol (RTSP) protocols to request data from the DMS 10.

Step 110: The DMS 10 begins to capture video data and audio data after receiving the request for data from the selected DMR 20.

Step 112: The captured video data is encoded by the DMS 10 using H.264, Moving Picture Experts Group-2 (MPEG-2), and other video encoding formats supported by DLNA devices, and the captured audio data is encoded by the DMS 10 using Advanced Audio Coding (AAC), MPEG, pulse-code modulation (PCM), and other audio encoding formats supported by DLNA devices.

Step 114: The encoded video data and the encoded audio data are combined to form a data container using MPEG transport stream (TS), program stream (PS), MPEG-4, or other suitable streaming data container types supported by DLNA devices. The streaming data is then sent to the DMR 20.

Step 116: The DMR 20 starts playback after receiving the streaming data from the DMS 10.

Step 118: Determine if the DMR 20 receives a stop command from the DMC 30. If so, go to step 120. If not, go back to step 108.

Step 120: The DMR 20 stops playback and the HTTP/RTSP connection is stopped between the DMR 20 and the DMS 10.

Step 122: The DMS 10 stops capturing and encoding video and audio.

Step 124: End.

Advantageously, the DLNA protocol is used to facilitate communication between the DMS 10, DMR 20, and DMC 30. Furthermore, when the DMS 10 encodes captured video data and captured audio data, the encoding process can take advantage of hardware acceleration for reducing the load on a central processing unit (CPU) of the DMS 10. The captured video can be captured in high definition (HD) to ensure a clear picture without any distortion. Since the video data and audio data are captured by the DMS 10 in real time, there will be little to no delay experienced while capturing the data. In addition, the audio data and the video data will be transmitted from the DMS 10 to the DMR 20 synchronously in order to avoid the problem of the audio data being out of sync with the video data. Any number of devices can be supported in the media sharing system 5, and the devices can connect through either a wired LAN or a wireless LAN.

In summary, the present invention provides a way for the DMS 10 to communicate with the DMR 20 and output video content to the DMR 20 without the need to replace or upgrade hardware since the DMS 10, the DMR 20, and the DMC 30 all communicate using the DLNA protocol. Video and audio content is captured by the DMS 10 before it is encoded for transmission to the DMR 20. Therefore, video can easily be shared from the DMS 10 to the DMR 20 without the need to upgrade any equipment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of outputting video content from a digital media server (DMS) to a digital media renderer (DMR), the method comprising:
   providing a digital media controller (DMC) to select a DMR for video playback;
   sending a playback request from the DMC to the selected DMR, wherein the DMC, the selected DMR, and the DMS each communicate with one another through a network;
   the selected DMR requesting data from the DMS in response to receiving the playback request from the DMC;
   the DMS capturing video and capturing audio;
   the DMS encoding the captured video and the captured audio to respectively produce encoded video and encoded audio;
   outputting the encoded video and the encoded audio from the DMS to the selected DMR; and
   playing the encoded video and the encoded audio on the selected DMR directly without the selected DMR first decoding the encoded video and the encoded audio.

2. The method of claim 1, wherein the DMS is a computer.

3. The method of claim 2, wherein the step of the DMS capturing video comprises the computer capturing video content shown on a display of the computer.

4. The method of claim 1, wherein the Digital Living Network Alliance (DLNA) protocol is used for communication between the DMC, the DMS, and the selected DMR.

5. The method of claim 1, wherein the DMS encodes the captured video in the H.264 or Moving Picture Experts Group-2 (MPEG-2) video format.

6. The method of claim 1, wherein the DMS encodes the captured audio in the Advanced Audio Coding (AAC), Moving Picture Experts Group (MPEG), or pulse-code modulation (PCM) audio format.

7. The method of claim 1, wherein the DMS combines the encoded video and the encoded audio into a data container before outputting the encoded video and the encoded audio to the selected DMR.

8. The method of claim 7, wherein the data container is a Moving Picture Experts Group (MPEG) transport stream (TS), program stream (PS), or Moving Picture Experts Group-4 (MPEG-4) streaming data container.

9. The method of claim 1, wherein the selected DMR is a television.

10. The method of claim 1, wherein when DMC controls the selected DMR to stop playing while the selected DMR is playing the encoded video and the encoded audio the DMS stops generating the encoded video and the encoded audio.

11. A media sharing system for sharing video content, the media system comprising:
    a digital media controller (DMC) selecting a digital media renderer (DMR) for video playback and sending a playback request from the DMC to the selected DMR;
    a digital media server (DMS) capturing video and capturing audio in response to receiving a data request from the selected DMR, the DMS encoding the captured video and the captured audio to respectively produce encoded video and encoded audio, and the DMS outputting the encoded video and the encoded audio to the selected DMR, wherein the DMC, the selected DMR, and the DMS each communicate with one another through a network; and
    the selected DMR playing the encoded video and the encoded audio directly without the selected DMR first decoding the encoded video and the encoded audio in response to receiving the encoded video and the encoded audio from the DMS.

12. The media sharing system of claim 11, wherein the DMS is a computer.

13. The media sharing system of claim 12, wherein the DMS capturing video comprises the computer capturing video content shown on a display of the computer.

14. The media sharing system of claim 11, wherein the Digital Living Network Alliance (DLNA) protocol is used for communication between the DMC, the DMS, and the selected DMR.

15. The media sharing system of claim 11, wherein the DMS encodes the captured video in the H.264 or Moving Picture Experts Group-2 (MPEG-2) video format.

16. The media sharing system of claim 11, wherein the DMS encodes the captured audio in the Advanced Audio Coding (AAC), Moving Picture Experts Group (MPEG), or pulse-code modulation (PCM) audio format.

17. The media sharing system of claim 11, wherein the DMS combines the encoded video and the encoded audio into a data container before outputting the encoded video and the encoded audio to the selected DMR.

18. The media sharing system of claim 17, wherein the data container is a Moving Picture Experts Group (MPEG) transport stream (TS), program stream (PS), or Moving Picture Experts Group-4 (MPEG-4) streaming data container.

19. The media sharing system of claim 11, wherein the selected DMR is a television.

20. The media sharing system of claim 11, wherein when DMC controls the selected DMR to stop playing while the selected DMR is playing the encoded video and the encoded audio the DMS stops generating the encoded video and the encoded audio.

* * * * *